United States Patent [19]

Jager et al.

[11] 4,327,281

[45] Apr. 27, 1982

[54] AQUARIUM IMMERSION HEATER WITH DRY OPERATION PREVENTION THERMOSTATIC SWITCH

[75] Inventors: Wolfgang Jager, Wustenrot-Finsterrot, Fed. Rep. of Germany; Erhard Boettger, El Segundo, Calif.

[73] Assignee: Ebo-Jager, Inc., El Segundo, Calif.

[21] Appl. No.: 122,000

[22] Filed: Feb. 19, 1980

[30] Foreign Application Priority Data

Jul. 6, 1979 [DE] Fed. Rep. of Germany ....... 2927280

[51] Int. Cl.³ .......................... H05B 1/02; H05B 3/80
[52] U.S. Cl. .................................. 219/523; 219/318; 219/330; 219/331; 219/335; 219/512; 219/530; 338/270
[58] Field of Search ............... 219/523, 318, 316, 328, 219/331, 335–338, 510–513, 330, 530, 540; 338/270, 268

[56] References Cited

U.S. PATENT DOCUMENTS

| | | | |
|---|---|---|---|
| 1,823,048 | 9/1931 | Hughes | 219/335 X |
| 2,456,030 | 12/1948 | Sohns | 219/241 |
| 3,371,192 | 2/1968 | Rosenel | 219/331 X |
| 3,439,150 | 4/1969 | Wells et al. | 219/523 |
| 3,746,836 | 7/1973 | Summerfield | 219/328 |
| 3,767,898 | 10/1973 | Wells et al. | 219/523 X |
| 4,149,067 | 4/1979 | Jager | 338/270 X |

Primary Examiner—Anthony Bartis
Attorney, Agent, or Firm—Charles H. Schwartz; Ellsworth R. Roston

[57] ABSTRACT

An aquarium heater includes a tubular glass housing provided with a temperature control circuit in the upper part thereof for switching on and off a heating element disposed in the lower part of the housing and comprising an elongated non-metallic support tube on which a helical resistance heating wire is wound. A temperature responsive bimetallic breaker switch enclosed in a metallic housing is coupled within a feed line to the heating wire and is located in the interior of the support tube slightly below the upper end thereof and extends within a number of turns of the heating wire, with length of the breaker switch representing a small fraction of the length of the support tube. The interior of the housing and the support tube are filled with sand to the extent that the breaker switch and heating wire are completely enclosed by sand to improve heat transfer between the heating wire and breaker switch thereby making the breaker switch quickly responsive to dry operation of the heater to deenergize the heating wire.

4 Claims, 1 Drawing Figure

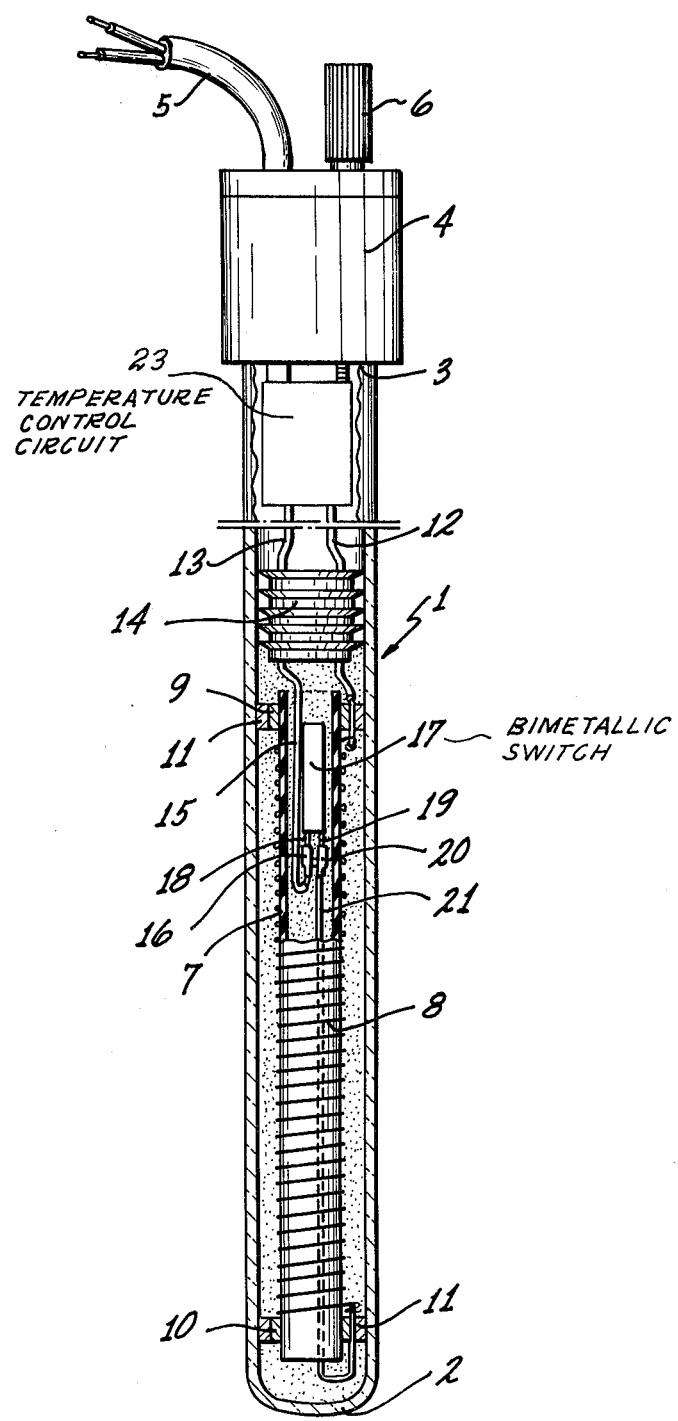

AQUARIUM IMMERSION HEATER WITH DRY OPERATION PREVENTION THERMOSTATIC SWITCH

The present invention relates to an aquarium heater generally constructed with a tubular outer housing made of glass, or metal. The upper part of the housing accommodates a control mechanism for providing temperaure responsive switching off and on of a heating element. The heating element is disposed in the lower part of the housing, and the heating element typically consists of a tube on which a heating wire is wound.

Aquarium heaters of this type have been manufactured in large quantities and are used for heating the aquarium water to a constant temperature. In the prior art the tubular outer housing is usually constructed of glass, since glass will not corrode in water. However, the use of glass housings causes problems in that glass housings are not capable of withstanding extreme temperature changes. In a normal operation of the aquarium heater, this is not important, since the glass housing is submerged in the aquarium water and the heat generated by the heater is conducted over the total surface of the heater and through all of the water in the aquarium.

Difficulties arise when the heater is operated dry such as when the heater is removed from the water or when the water in the aquarium is emptied out. In either of these cases high temperatures may occur in certain areas of the glass housing so that at a subsequent submersion of the heater in the aquarium water (or on refilling the aquarium with water) a breakage of the glass vessel may result. Even if the glass housing does not break, the high temperatures on the surface of the housing may be dangerous.

The aquarium heaters of the prior art generally have a temperature responsive control circuit normally accommodated in the upper part of the heater. However, the prior art control circuit will not respond quickly enough when the heater is operated dry. The heat, in the prior art types of heaters, is generated in the lower part and the heat conduction in the interior of the heater is extremely bad, since glass and air are poor heat conductors. As long as the aquarium heater is submerged in the water, an equalization of the temperature occurs along the housing walls through the surrounding water. However, when the heater is operated dry, such an equalization can no longer take place, so that the control circuit cannot interrupt the heating fast enough, even when extremely high temperatures prevail in the lower part of the heater.

It is an object of the invention to improve an aquarium heater of the previously described type so that the danger of overheating of the heater is avoided even when the heater is operated dry.

The problem of overheating of the prior art heaters as previously described is solved, according to the present invention, by the use of a separate temperature responsive current breaker which is connected in the feed line leading to one end of the heating wire. The separate current breaker is physically located slightly below the upper end of an interior position within the tube which supports the winding forming the heating wire. The space between the housing wall and heat winding tube, as well as the interior space of the tube are filled with sand so that the temperature responsive current breaker switch is completely enclosed by sand.

When the temperature responsive current breaker is disposed in the upper area of the heating tube, it appears that the current to the heater is reliably disconnected when the heater is operated dry. The temperature responsive current breaker does not interfere with the normal operation of the heater since during normal operation it remains closed. When the heater is operated dry, such as by emptying the aquarium, the temperature responsive switch quickly responds to the increased temperature and prevents an excessive heating of the glass cover of the housing. The filling of the glass vessel with sand serves to improve the heat transfer between the heater winding, on one hand, and the temperature responsive current breaker on the other hand. Moreover, the heat transfer to the glass cover of the housing is also improved.

In a preferred embodiment, the temperature responsive current breaker is arranged in a sealed metal or plastic housing from which two electric terminal lugs project and with the lugs insulated from one another.

One of the current feeding lines to the heater winding may be interrupted and both ends of the interrupted line may be plugged into the terminal lugs by the use of cable clips or the like. The temperature responsive switch is preferably a bimetallic switch.

The following description of a preferred embodiment of the invention is intended, in conjunction with the sole view of the drawing, as a detailed explanation. The drawing shows a partially sectional view of the aquarium heater, and with the center area removed.

The aquarium heater of the present invention comprises a tubular glass housing 1, which is closed at the lower end 2 and open at the upper end 3. The upper part of the housing 1 is closed by means of a cap 4 mounted over the upper end. The cap 4 provides for a watertight arrangement for an electric feed line 5 and a control knob 6 for a temperature control circuit 23 of a known construction which is disposed in the upper part of the housing.

In the drawing the area of the heater below the control circuit is shown in cross-section. In that area is a glass tube 7, around which a heating wire 8 is wound. At the ends of the glass tube 7, holding and centering rings 9 and 10 are mounted, which rings center the glass tube 7 by means of protruding ribs 11 which contact the glass housing. Electric feed lines 12 and 13 extend from the temperature control circuit in the upper end 3 of the housing 1 and through a plug 14 pushed tightly into the housing. The end of the feed line 12 is, in the area of the upper holding and centering ring 9, connected to the upper end of the heating wire 8. The end of the feed line 13 is in the area of the upper holding and centering ring 9, formed as a line section 15, which section 15 leads into the interior of the glass tube 7 and carries on its end a cable clip 16.

In the interior of the glass tube 7 slightly below its upper end a bimetallic switch 17 is arranged. The switch 17 is enclosed within a metal housing, from which two terminal lugs 18 and 19 project. The cable clip 16 of line section 15 is connected to one terminal lug 18, and a cable clip 20 is on the other terminal lug 19, and the lug is connected to the free end of another line section 21. The line sectin 21 runs through the interior of the glass tube 7 to the lower holding and centering ring 10 and is, at this location, connected to the lower end of the heating wire 8.

The area of the housing 1 below plug 14 is filled with sand, and in particular the metal housing of the bimetallic switch 17 located within the glass tube 7 is completely covered with sand.

The position of the bimetallic switch 17 is important since if the switch were in the middle position along the length of the tube 7, the switch 17 could open during normal operation. If the switch 17 were at the bottom of the tube 7, the switch could be covered by low water during draining and would not work to provide over-temperature protection. If the switch 17 were too high in position, the switch would not sense the over-temperature condition.

The switching point of the bimetallic switch 17 is chosen so that when the heater is operated dry the connection of feed line 13 with heating wire 8 is broken before the glass cover can reach an outside temperature which with a sudden cooling-off could cause its breakage. On the other hand, the switching point is not so low that, when heating the heating wire 8 under normal conditions (with a submerged heater), an interruption of current would result.

By virtue of the arrangement of the bimetallic switch in the interior of the heating element which is formed by the glass tube 7 and heating wire 8, the bimetallic element responds very quickly to excessive temperature increases in the heating area, which excessive temperature would normally occur only when the heater is operated dry. The interruption of the heating therefore takes place much faster than the interruption of the heating by way of the control circuit arranged in the upper part of the heater. The control circuit would operate slowly due to the poor heat conduction of the glass cover and since the air in the interior of the heater cannot quickly respond to the temperature rise in the lower area of the heater.

The use of the temperature responsive switch as part of the aquarium heater of the present invention allows for a safer design of aquarium heaters having a higher wattage than prior art heaters. This is because the heater is protected from breakage due to overheating, and this is a greater problem with higher wattage heaters.

Although the invention has been described with reference to a particular embodiment, it is to be appreciated that various adaptations and modifications may be made and the invention is only to be limited to the appended claims.

We claim:

1. In an aquarium heater having a tubular housing, and with a control circuit in the upper part of the housing for temperature responsive off and on switching of a heating element disposed in the lower part of the housing, and with the heating element constructed by an elongated non-metallic support tube on which a helical heating wire is wound, the improvement comprising a temperature responsive breaker switch coupled within a feed line leading to one end of the heating wire, the temperature responsive breaker switch located slightly below the upper end in the interior of the elongated non-metallic support tube supporting the heating wire and extending within a number of turns of the heating wire and with the length of the breaker switch within the number of turns supported on the elongated support tube representing a small fraction of the length of the elongated support tube, and with the space between the tubular housing wall and the tube supporting the heating wire and the interior space of tube supporting the wire filled with sand so that the temperature responsive breaker switch is completely enclosed by sand. pg,10

2. The aquarium heater of claim 1 wherein the temperature responsive breaker switch is enclosed within a housing, and with two electrical terminal lugs insulated from one another projecting therefrom.

3. The aquarium heater of claim 2 wherein both ends of the feed line include cable clips for mounting on the terminal lugs.

4. The aquarium heater of claim 1 wherein the temperature responsive breaker switch is a bimetallic switch.

* * * * *